US007868071B2

(12) United States Patent
Luo et al.

(10) Patent No.: US 7,868,071 B2
(45) Date of Patent: Jan. 11, 2011

(54) METHOD OF STABILIZING AQUEOUS CATIONIC POLYMERS

(75) Inventors: Yuping Luo, Duluth, GA (US); Clay E. Ringold, Decatur, GA (US); Dexter C. Johnson, Stone Mountain, GA (US); Cornel Hagiopol, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 11/830,426

(22) Filed: Jul. 30, 2007

(65) Prior Publication Data

US 2009/0036577 A1 Feb. 5, 2009

(51) Int. Cl.
C08G 18/28 (2006.01)
C08K 5/00 (2006.01)
C08K 5/15 (2006.01)
C08K 5/16 (2006.01)
A61K 9/16 (2006.01)
C08L 5/00 (2006.01)
C08L 29/04 (2006.01)
D21H 21/14 (2006.01)
C08F 2/24 (2006.01)

(52) U.S. Cl. .......... 524/210; 524/211; 524/56; 524/58; 524/503; 524/724

(58) Field of Classification Search .......... 524/56, 524/58, 503, 211, 724, 210
See application file for complete search history.

(56) References Cited

U.S. PATENT DOCUMENTS

| | | | |
|---|---|---|---|
| 2,926,154 A | 2/1960 | Keim | |
| 3,086,961 A | 4/1963 | House et al. | |
| 3,197,427 A | 7/1965 | Schmalz et al. | |
| 3,227,671 A | 1/1966 | Keim et al. | |
| 3,240,761 A | 3/1966 | Keim et al. | |
| 3,259,600 A | 7/1966 | Coscia et al. | |
| 3,311,594 A | 3/1967 | Earle | |
| 3,352,833 A | 11/1967 | Earle | |
| 3,442,754 A | 5/1969 | Espy | |
| 3,592,731 A * | 7/1971 | Griggs | 430/538 |
| 3,700,623 A | 10/1972 | Keim | |
| 3,772,076 A | 11/1973 | Keim | |
| 3,839,291 A * | 10/1974 | Avis | 528/250 |
| 3,891,589 A | 6/1975 | Ray-Chaudhuri | |
| 3,954,680 A | 5/1976 | Jansma | |
| 3,965,084 A * | 6/1976 | Schiff | 562/34 |
| 4,016,123 A * | 4/1977 | Matsuda et al. | 524/839 |
| 4,028,306 A * | 6/1977 | Wagner et al. | 528/61 |
| 4,075,177 A * | 2/1978 | Bonnet et al. | 525/430 |
| 4,136,079 A * | 1/1979 | Katayama et al. | 524/779 |
| 4,233,417 A | 11/1980 | Van Eenam | |
| 4,235,764 A * | 11/1980 | Dereser et al. | 524/503 |
| 4,298,715 A | 11/1981 | Van Eenam | |
| 4,310,692 A * | 1/1982 | Findeisen et al. | 564/61 |
| 4,341,887 A | 7/1982 | Buriks et al. | |
| 4,383,068 A * | 5/1983 | Brandt | 524/196 |
| 4,460,722 A * | 7/1984 | Igarashi et al. | 523/206 |
| 4,461,858 A * | 7/1984 | Adelman | 524/49 |
| 4,487,884 A | 12/1984 | Maslanka | |
| 4,537,657 A * | 8/1985 | Keim | 162/164.3 |
| 4,714,736 A | 12/1987 | Juhl et al. | |
| 4,752,429 A * | 6/1988 | Grosbard | 264/141 |
| 4,788,243 A * | 11/1988 | Soerens | 524/503 |
| 4,853,431 A | 8/1989 | Miller | |
| 4,902,779 A * | 2/1990 | Waldmann | 528/422 |
| 5,019,606 A | 5/1991 | Marten et al. | |
| 5,057,570 A * | 10/1991 | Miller et al. | 524/503 |
| 5,147,908 A * | 9/1992 | Floyd et al. | 524/49 |
| 5,256,727 A | 10/1993 | Dulany et al. | |
| 5,510,004 A | 4/1996 | Allen | |
| 5,563,192 A * | 10/1996 | Sachinvala et al. | 524/56 |
| 5,624,532 A * | 4/1997 | Trokhan et al. | 162/111 |
| 5,644,021 A | 7/1997 | Maslanka | |
| 5,668,246 A | 9/1997 | Maslanka | |
| 5,902,473 A * | 5/1999 | Harris et al. | 205/229 |
| 5,994,453 A * | 11/1999 | Banning et al. | 524/590 |
| 6,042,691 A * | 3/2000 | Nitzman et al. | 162/180 |
| 6,056,967 A * | 5/2000 | Steuerle et al. | 424/401 |
| 6,165,322 A | 12/2000 | Bower | |
| 6,222,006 B1 | 4/2001 | Kokko et al. | |
| 6,255,271 B1 | 7/2001 | Carswell et al. | |

(Continued)

FOREIGN PATENT DOCUMENTS

EP    0717146 A2    6/1996

(Continued)

OTHER PUBLICATIONS

N. Dunlop-Jones, Paper Chemistry, Chapter 6, 1991, pp. 76-96, Blackie & Son Ltd.
Communication Relating to the Results of the Partial International Search for PCT/US2008/071353 mailed Nov. 11, 2008.
PCT International Search Report and Written Opinion of the International Searching Authority for PCT/US2008/071353 mailed Jan. 20, 2009.

*Primary Examiner*—Mark Eashoo
*Assistant Examiner*—Liam J Heincer
(74) *Attorney, Agent, or Firm*—Michael S. Kerns

(57) ABSTRACT

Cationic thermosetting resins and especially resins having azetidinium functional groups, such as polyamidoamine-epichlorohydrin resins, are stabilized against premature gelation by the addition of (1) a low molecular weight, non-aldehyde, non-ionic, water soluble organic stabilizing compound (preferably one that is reactive with the cationic moiety), preferably in combination with (2) a water soluble, inorganic complexing metal salt.

17 Claims, No Drawings

U.S. PATENT DOCUMENTS

| | | |
|---|---|---|
| 6,273,997 B1 * | 8/2001 | Ehrhardt et al. ............ 162/158 |
| 6,429,267 B1 | 8/2002 | Riehle |
| 6,444,737 B1 * | 9/2002 | Rayner ...................... 524/195 |
| 6,458,343 B1 * | 10/2002 | Zeman et al. ................ 424/63 |
| 6,554,961 B1 | 4/2003 | Riehle et al. |
| 6,586,520 B1 * | 7/2003 | Canorro et al. ............. 524/514 |
| 6,686,054 B2 | 2/2004 | Nigam |
| 6,808,597 B2 * | 10/2004 | Allen ......................... 162/111 |
| 6,896,769 B2 | 5/2005 | Shannon et al. |
| 6,919,109 B2 * | 7/2005 | Nakano et al. ........... 428/32.26 |
| 7,081,512 B2 | 7/2006 | Riehle |
| 7,091,172 B2 | 8/2006 | Oakes et al. |
| 7,175,740 B2 | 2/2007 | Riehle et al. |
| 7,189,307 B2 | 3/2007 | Goulet et al. |
| 2001/0003778 A1 * | 6/2001 | Furunaga et al. ......... 536/123.1 |
| 2002/0053412 A1 * | 5/2002 | Schroeder et al. .......... 162/111 |
| 2002/0068805 A1 * | 6/2002 | Futami et al. ............ 526/307.5 |
| 2003/0000667 A1 | 1/2003 | Riehle et al. |
| 2003/0070783 A1 * | 4/2003 | Riehle et al. ............... 162/166 |
| 2003/0087112 A1 * | 5/2003 | Nigam ...................... 428/457 |
| 2004/0118533 A1 * | 6/2004 | Shannon et al. ............ 162/109 |
| 2005/0006042 A1 | 1/2005 | Riehle et al. |
| 2005/0028954 A1 * | 2/2005 | Neal et al. .................. 162/111 |
| 2005/0136265 A1 * | 6/2005 | Liu et al. ................... 428/447 |
| 2005/0227010 A1 | 10/2005 | Parker |
| 2005/0288182 A1 * | 12/2005 | Torii et al. ................. 502/402 |
| 2006/0032595 A1 * | 2/2006 | Yeh et al. ................... 162/111 |
| 2006/0052497 A1 * | 3/2006 | Hopfmann et al. ......... 524/236 |
| 2006/0260774 A1 * | 11/2006 | Rodriguez et al. .......... 162/135 |
| 2007/0054144 A1 * | 3/2007 | Dopico et al. ............ 428/537.1 |
| 2007/0185281 A1 * | 8/2007 | Song et al. ................. 525/375 |

FOREIGN PATENT DOCUMENTS

| | | |
|---|---|---|
| EP | 1 770 109 A2 | 4/2007 |
| EP | 1 770 110 A2 | 4/2007 |
| WO | WO 99/06469 | 2/1999 |
| WO | WO 99/33901 | 7/1999 |
| WO | WO 00/15747 | 3/2000 |
| WO | WO 00/15748 | 3/2000 |
| WO | WO 00/77076 | 12/2000 |
| WO | WO 02/50163 | 6/2002 |
| WO | WO 03/037960 | 5/2003 |
| WO | WO 2004/106412 | 12/2004 |

\* cited by examiner

_US 7,868,071 B2_

METHOD OF STABILIZING AQUEOUS CATIONIC POLYMERS

FIELD OF THE INVENTION

The present invention relates to a method of improving the storage stability of cationic wet-strengthening agents useful in papermaking, especially those cationic wet-strengthening agents having azetidinium moieties or groups. In particular, the present invention relates to storage stable wet-strengthening resin compositions especially those resins comprising the reaction product of a polyamidoamine and a epihalohydrin, the reaction product having azetidinium moieties or groups.

BACKGROUND OF THE INVENTION

Cationic polymers or resins exhibiting thermosetting properties are useful for increasing the wet strength of paper products and reducing paper "creep" while the paper is wet. One well-known class of such polymers is the polyamidoamine-epihalohydrin (PAE) resins. In the absence of such cationic wet strengthening resins, paper normally retains only about 3% to 5% of its strength after being wetted with water. However, paper made or treated with a cationic wet strengthening resin, such as a PAE resin, generally retains at least 10%-50% of its strength when wet. As such, these resins are in wide use.

As is well-known, the PAE resins can be made by the reaction of an epihalohydrin, usually epichlorohydrin, with a polyamidoamine (alternatively referred to as a polyaminoamide, a polyamidopolyamine, a polyaminopolyamide, a polyaminamide and the like). The reaction is typically performed in an aqueous solution under a basic condition (e.g., at a pH between about 7 to about 11) often followed by diluting the reaction product to a relatively low solids content.

Such PAE resins also can be blended with other ionic or non-ionic polymers, such as but not limited to polyvinyl alcohol (PVA) polymers, polyethylene oxide (PEO) polymers, hydroxyethylcelluloses, poly diallyldimethyl ammonium chloride (DADMAC) polymers and the like, for wet strengthening applications. These resin or polymer blends also tend to exhibit a limited storage stability depending in part on the component ratios in the blends.

Historically, due to the high reactivity of such cationic polymers and particularly the widely used PAE resins, the solids contents of the final resin solutions have been diluted to and maintained at about 10 to 15% in order to prevent premature gelation of the resin upon standing (storage) at room temperature. Such gelation obviously contributes to a loss of wet strength efficiency and often renders the resin totally unusable. Thus, for the most part, such cationic resins and the PAE resins in particular have been shipped and stored in a relatively dilute form to paper mills where the resins are ultimately used. This practice increases costs to the mill since, in effect, the mill is paying shipping costs for transporting water and added storage costs because of the higher volume of material being stored.

Given these circumstances, the art has long recognized the benefit that could be obtained by increasing the solids content of aqueous cationic thermosetting polymers, such as the noted PAE resins. Unfortunately, untreated cationic thermosetting polymers, such as the PAE resins, stored at higher solids concentrations are more prone to experience a gradual increase in viscosity to gelation. The inherent viscosity increase places a time limit on how long such resins can be stored before they must be used. Stability is generally judged by the time between the preparation of the polymer or resin and the time it gels (i.e., the viscosity increase is so great that the resin becomes non-functional).

In one approach for improving the storage stability of PAE resins, such resins have been contacted with an acid to stabilize the product. See, for example, U.S. Pat. Nos. 3,311,594, 3,197,427, 3,442,754 and 4,853,431. Ordinarily, the higher that the solids content in the resin solution is, the lower the pH must be maintained in order to provide for suitable storage stability of the resin, i.e., to prevent the material from prematurely forming a gel. Reducing pH to improve stability, however, has its limits since increasingly lowering the pH exacerbates resin hydrolysis and thus reduces the wet strengthening effectiveness of the resin, especially cationic PAE resins.

In another stabilization approach. Keim in U.S. Pat. No. 3,240,761, for example, includes a quaternizing agent such as an alkyl halide during the latter stages of the polyamide-epichlorohydrin reaction. Coscia U.S. Pat. No. 3,259,600 describes adding a stoichiometric excess of certain metal complexing salts to the aqueous resin solution in order to form metal coordination complexes which purportedly enhance resin stability. Earle, in U.S. Pat. No. 3,352,833, describes using an acidic hydrogen halide such as hydrochloric acid, to stabilize the epichlorohydrin moiety of such aqueous resins purportedly without reducing wet strength efficiency by forming the corresponding aminochlorohydrin hydrochloride. Keim, in U.S. Pat. No. 3,227,671, describes adding a small quantity of formaldehyde to the PAE resin following its synthesis and before the resin is cooled to improve its storage stability.

In yet another approach alleged to produce a high solids PAE resin that is stable for up to four weeks, U.S. Pat. No. 6,222,006 reacts epichlorohydrin with an end-capped polyaminamide (polyamidoamine). As described, the polyaminamide is end-capped with hydrocarbon radical(s) by including a monoacid or monoester (or alternatively some functional equivalent chain terminator) in the synthesis of the polyaminamide.

While these approaches have had some success in improving the stability of cationic wet strengthening polymers and especially PAE wet strengthening resins, there remains much room for further improvement. Accordingly, the art continues to search for alternative ways to stabilize such water-soluble, cationic wet strengthening polymers, such as the cationic polyamidoamine-epihalohydrin (PAE) resins, with the goal of permitting such polymers to be maintained in solution at a relatively higher solids content without the need to lower excessively the pH of the solution and risk resin hydrolysis. In particular, a procedure which stabilizes a high solids content aqueous solution of a cationic polymer resin, such as a PAE resin, against gelation, while at the same time providing stability against a significant loss in solution viscosity would constitute a significant improvement.

BRIEF DESCRIPTION OF THE INVENTION

The present invention relates to a method of improving the storage stability of cationic wet-strengthening agents (e.g., resins and polymers) useful in papermaking, as well as blends of such cationic wet-strengthening agents with other resin and polymer materials. The invention especially relates to a method of improving the storage stability of water soluble thermosetting cationic polymers and blends containing such polymers that have azetidinium moieties or groups in their structure. In particular, the present invention relates to storage stable cationic wet-strengthening polymer or resin compositions, especially those polymers or resins which are the reaction products of a polyamidoamine and an epihalohydrin, such as epichlorohydrin, the reaction products having azetidinium moieties or groups (i.e., cationic PAE resins).

Applicants have discovered that the addition to an aqueous thermosetting cationic polymer or resin (including blends containing such aqueous thermosetting cationic polymers or resins) and particularly to a thermosetting cationic polymer or resin having azetidinium moieties or groups such as a PAE resin, of certain non-aldehyde, low molecular weight, non-ionic, water soluble organic stabilizing compounds, optionally in combination with a water soluble, inorganic complexing metal salt, provides a surprising improvement in the level or duration of storage stability to such aqueous thermosetting cationic polymers or resins and particularly to cationic thermosetting PAE resins. Such non-aldehyde, low molecular weight, non-ionic, water soluble organic stabilizing compounds can be selected from the group consisting of (a) water soluble tertiary amines, such as triethanolamine, 2-dimethylamino ethanol, and aminopropyl diethanolamine and the like (b) water soluble amides and especially water soluble primary amides such as adipamide $NH_2C(O)(CH_2)_4C(O)NH_2$), thiourea ($NH_2C(S)NH_2$), lower molecular weight urea-formaldehyde oligomers, urea ($NH_2C(O)NH_2$) and water soluble polyamine-urea adducts, such as the urea adduct with 3,3'-diamino-N-methyldipropylamine, i.e., ($NH_2C(O)N(H)$—$(CH_2)_3$—$N(CH_3)$—$(CH_2)_3N(H)C(O)NH_2$) and the like, (c) lower molecular weight carbohydrates including various monosaccharides, disaccharides, trisaccharides, and polysaccharides, (d) lower molecular weight polyalcohols (polyols) including glycerol, sorbitol, polyvinyl alcohol and various other polyols and (e) mixtures thereof.

The stability enhancing combination of the non-aldehyde, low molecular weight, non-ionic, water soluble organic stabilizing compound or a combination of such stabilizing compounds and the water soluble, inorganic complexing metal salt can be used alone as a stabilization technique, or alternatively and preferably can itself be used in combination with classical acid stabilization techniques, such as the addition of a combination of weak and strong acids to the cationic thermosetting resin or polymer, as exemplified, for example by U.S. Pat. No. 3,197,427 and U.S. Pat. No. 4,853,431, to improve the storage stability of the aqueous cationic thermosetting resins, and especially PAE resins.

Without wishing to be bound by any particular theory, applicants believe that by adding a non-aldehyde, low molecular weight, non-ionic, water soluble organic stabilizing compound to the cationic resin or polymer, such as to a PAE resin, and especially adding one of the types of stabilizing compounds identified above, such as a stabilizing compound with a tertiary amine function, or with a primary amide function and particularly adding an organic stabilizing compound that can react with an azetidinium moiety or group and especially a stabilizing compound that has a degree of reactivity with the azetidinium moiety or group similar to the reactivity of an amine moiety, such as the amine moiety of a PAE rein itself, the non-aldehyde stabilizing compound interferes with, and/or inhibits reactions between high molecular weight cationic polymer molecules, such as between PAE molecules. Such reactions between high molecular weight cationic polymer molecules, including PAE molecules, are thought to be responsible for the undesirable increase in viscosity observed in such resins or polymers on storage leading ultimately to premature gelation of such cationic resins, such as PAE resins.

Again, though not wishing to bound to any particular explanation, applicants believe that as the added low molecular weight non-aldehyde stabilizing compound (molecule) reacts with an azetidinium group (or an equivalent moiety that provides the cationic polymer with its thermosetting property as explained in more detail hereinafter) of a thermosetting cationic resin (e.g., a PAE molecule) there is a negligible change in the molecular weight of the cationic resin or polymer (e.g., the PAE resin) and thus only a negligible change in viscosity of the cationic resin or polymer (e.g., the PAE resin). By also adding a water soluble, inorganic complexing metal salt to the cationic resin or polymer, especially a PAE resin, applicants also believe (but do not wish to be bound to this explanation either) that the rate at which these inhibiting reactions between the added low molecular weight non-aldehyde stabilizing compound and the cationic resin or polymer (e.g., the PAE resin) molecules occur also is suitably retarded, so that these reactions do not cause or contribute to an undesired decrease in the wet strengthening efficiency of the cationic resin or polymer, such as a cationic PAE resin. The overall result is thus a significant improvement in the storage stability of the cationic resin or polymer, e.g., a cationic PAE resin, maintained at a relatively high solids content, without an undesired loss in wet strengthening efficiency.

Thus, without wishing to be bound by these prior explanations, applicants believe that suitable low molecular weight, non-aldehyde, non-ionic, water soluble organic stabilizing compounds are those compounds that are reactive with the moiety responsible for the thermosetting character of the cationic polymer or resin, such as the azetidinium moiety or group in the PAE resins.

As used throughout the specification and in the claims the terms polymer and resin are used interchangeably and are not intended to embrace different classes of materials.

These and other aspects of the invention are apparent from the following Detailed Description.

DETAILED DESCRIPTION OF THE INVENTION

Stabilization of an aqueous cationic thermosetting resin or polymer and especially an aqueous cationic thermosetting PAE resin in accordance with the present invention involves the addition, to the aqueous cationic resin or polymer, of (1) a non-aldehyde, low molecular weight, non-ionic, water soluble organic stabilizing compound. The non-aldehyde, low molecular weight, non-ionic, water soluble organic stabilizing compound is preferably, though optionally, added to the cationic resin in combination with (2) a water soluble, inorganic complexing metal salt. As noted above, it is believed that the non-aldehyde, low molecular weight, non-ionic, water soluble organic stabilizing compound should be reactive with the moiety responsible for the thermosetting character of the cationic resin or polymer, such as an azetidinium group in a cationic thermosetting PAE resin A variety of processes are known for making cationic thermosetting wet strengthening polymers or resins, as for example polyamidoamine-epihalohydrin (i.e., cationic PAE) resins. The thermosetting character of these polymers is typically due to the presence of azetidinium moieties (and moieties that are capable of forming azetidinium moieties) and/or quaternary ammonium epoxide moieties distributed along the backbone of the polymer chain. These types of polymers and processes for making such polymers are well known to those skilled in the art of wet strengthening resins and are described for example in the following documents, U.S. Pat. Nos. 2,926, 154, 3,086,961, 3,700,623, 3,772,076, 4,233,417, 4,298,639, 4,298,715, 4,341,887, 4,853,431, 5,019,606, 5,510,004, 5,644,021, 6,429,267 and 7,189,307, the disclosures of such resins and synthesis techniques in these patents for making such resins are hereby incorporated by reference.

Briefly described, these processes have two primary steps: the first step comprises forming a polymer backbone. In the case of a PAE resin in particular, a polyamide (e.g., a polyamidoamine) backbone is formed by reacting a dicarboxylic acid, a dicarboxylic acid halide, and/or a diester thereof with a polyalkylene polyamine. In the case of a thermosetting poly(diallylamine) polymer, the polymer backbone can be formed by the free radical homopolymerization of the diallylamine. Dicarboxylic acids suitable for use in preparing the polyamides used to produce the cationic PAE resins that can be stabilized in accordance with the present invention include saturated aliphatic dicarboxylic acids, preferably containing from about 3 to 8 carbon atoms. Preferred polyalkylene polyamines used in this initial reaction are those having two primary amine groups and at least one secondary amine group. The reaction normally can be conducted at a temperature within the range of 40-250° C.

Generally, sufficient dicarboxylic acid, or the diester or acid halide thereof, is supplied to react substantially completely with the primary amine groups on the polyalkylene polyamine, but the amount of acid, diester or acid halide is insufficient to react with secondary amine groups to any substantial extent. Thus, when using a polyalkylene polyamine having two primary amine groups, an appropriate mol ratio of polyalkylene polyamine to dicarboxylic acid (or diester or acid halide) usually will be between about 0.9:1 to about 1.2:1. Higher and lower mol ratios may on occasion be used with acceptable results. Normally, the reaction of polyamidoamines prepared at a mol ratio significantly below about 0.9:1 with an epihalohydrin leads to gelled products or products having a more pronounced tendency to gel, while the reaction of polyamides prepared at a mol ratio significantly above 1.2:1 typically yields products having a low molecular weight. These lower molecular weight products typically do not exhibit a sufficient degree of wet-strengthening capacity when later reacted with an epihalohydrin.

To prepare the cationic thermosetting polymer or resin, the so-prepared backbone polymer, such as a polyamide in the case of a PAE resin, is then reacted in a second step in an aqueous mixture with, for example, an epihalohydrin, such as epichlorohydrin, generally under a basic condition and at a temperature usually within the range of 45-250° C. In the case of the preferred PAE resin, the epihalohydrin-polyamide reaction usually is conducted for about 3-6 hours to form an aqueous solution of the polyamidoamine-epihalohydrin (PAE) resin at a solids concentration within the range of about 5-40% by weight. The length of the reaction period and the temperature at which the reaction takes place impact the viscosity (degree of advancement) of the PAE resin. The selection of appropriate parameters is well within the skill of the art. Functionalizing other backbone polymers with an epihalohydrin also is described in the prior art. While the thermosetting cationic polymers and resins made with such procedures can be stabilized in accordance with the present invention, such functionalization techniques and procedures themselves form no part of the present invention.

Generally, in the case of functionalizing the polyamidoamine, the reaction is allowed to proceed until the viscosity of the aqueous PAE resin system has reached a desired viscosity, e.g., often measured as a Gardner-Holdt viscosity. The Gardner-Holdt viscosity of the cationic PAL thermosetting resin usually should be at least a C and preferably for resins having about a 25% solids content or higher is at least an I to a K. A Gardner-Holdt viscosity of about a K to an M may often be preferred for a resin solution containing 20 to 25% solids. As recognized by those skilled in the art, Gardner-Holdt viscosities also can be converted to other measures of viscosity. Although dependent on specific reaction conditions, as noted above the time required to prepare a PAE resin of the desired viscosity generally will be about 3 to 6 hours. For resins of even higher solids content, a higher Gardner-Holdt viscosity would be appropriate. For example, for a 50% solids content resin, the Gardner-Holdt viscosity should at least be an M and preferably is at least a Z. As used herein, resin solids content is synonymous with resin non-volatile content.

Once the PAE resin reaction mixture has reached the desired viscosity, the reaction is generally quenched by adding an acid, along with cooling, to reduce the pH of the reaction mixture to less than 6.0 and usually to less than about 4.0.

Because of storage instability issues, the prior art has been limited in how far a thermosetting cationic resin or polymer, such as a PAE resin, should be advanced during the synthesis of a cationic resin and especially during the synthesis of these cationic PAE resins. Because of the stability enhancing advantage of the present invention, however, a more advanced cationic thermosetting resin or polymer, and especially a more advanced cationic thermosetting PAE resin, i.e., a PAE resin of a higher viscosity, can be prepared when practicing the present invention without encountering the same storage instability problems that have plagued the prior art.

As an exemplification of, and not for limiting the scope of the present invention, applicants hereafter identify materials potentially useful for synthesizing polyamidoamines suitable for making cationic thermosetting PAE resins.

As examples of diacids that can be used are adipic acid, glutaric acid, oxalic acid, sebacic acid, itaconic acid, azelaic acid and the like, or mixtures thereof. Again, this list is representative only, and should not be considered comprehensive or otherwise limiting. Still other dicarboxylic acids will be recognized by those skilled in the art. The dicarboxylic acid often is selected so that the resulting long-chain polyamide is preferably water-soluble or at least water-dispersable. For that reason, 4 to 6 carbon atom dicarboxylic acids typically are preferred. While blends of such dicarboxylic acids can be used, possibly including even longer chain dicarboxylic acids, the use of adipic acid alone is very often preferred.

The ester versions of any one of the above diacids, or those not listed by way of example, can also be used. In particular, dicarboxylic diesters suitable for preparing useful polyamides are the lower alkyl diesters produced by reacting the above noted $C_3$ to $C_8$ saturated aliphatic dicarboxylic acids with saturated aliphatic monohydric alcohols containing from 1 to 4 carbon atoms, i.e. methanol, ethanol, isopropanol, n-propanol and butanol. Methyl and ethyl esters usually are preferred with the methyl esters being particularly preferred. For example, dimethyladipate, dimethylglutarate, and dimethylsebacate and the like, or mixtures thereof should be suitable. The acid halides of suitable acids also can be employed.

Suitable polyalkylene polyamines for preparing the polyamidoamine resin include polyethylene polyamines, polypropylene polyamines, polybutylene polyamines and the like. Typically, suitable polyalkylene polyamines contain two primary amine groups and at least one secondary amine group wherein the nitrogen atoms are linked together by groups of the formula $-C_nH_{2n}-$ where n is a small integer greater than unity and the number of such groups in the molecule ranges from 2 up to about 8 and preferably up to about 4. The nitrogen atoms may be attached to adjacent carbon atoms in the group $-C_nH_{2n}-$ or to carbon atoms further apart, but should not be attached to the same carbon atom. Examples of suitable polyalkylene polyamines for making PAE resins include diethylenetriamine, triethylenetetraamine, dipropylenetriamine and the like, or mixtures thereof. The reaction product of urea and a polyalkylene polyamine also can be used. Still other polyamines will be recognized by those skilled in the art. Based on a variety of considerations diethylenetriamine often is preferred. It is also possible to use mixtures of such polyamines as well as crude polyamine materials. Polyamines such as those in the JEFFAMINE® family (Huntsman, LLC) may also be employed. As noted above, the polymerization of the diacid, its acid halide, or its diester and the polyalkylene polyamine results in a polyamidoamine polymer.

The reaction between the diacid, its acid halide or its diester and the polyalkylene polyamine normally is continued until the diamine monomers and the diacid monomers (or diacid monomer equivalent) are consumed. The reaction between the dicarboxylic acid, or the diester, or acid halide thereof and the polyalkylene polyamine can usually be conducted at a temperature of from about 40° C. up to about 250° C. at atmospheric pressure. Generally, when using a dicarboxylic acid, temperatures between about 110° C. and 200° C. are typical. As recognized by those skilled in the art, lower temperatures, e.g. between about 80 and 160° C. may be used when reacting a diester, or acid halide of the dicarboxylic acid with the polyamine. Selection of appropriate conditions for the reaction are within the skill of the art and do not form a part of the present invention.

Following formation of the polyamidoamine polymer, the polyamidoamine polymer and an epihalohydrin, such as epichlorohydrin, are reacted, usually under an alkaline reaction condition to functionalize the polyamidoamine. This reaction serves to build the PAE molecular weight and impart both the cationic nature and thermosetting character to the PAE resin.

Preferably, sufficient epihalohydrin, e.g., epichlorohydrin, is used to convert most, if not all secondary amine groups of the polyamidoamine to tertiary amine groups and/or quaternary ammonium groups including azetidinium groups. Generally, from about 0.5 mols to about 1.8 mols of epichlorohydrin are used per mol of polyamidoamine secondary amines. Preferably, about 1.0 mol to about 1.7 mols of epichlorohydrin are used per mol of polyamidoamine secondary amines. Typically, PAE resin wet strengthening efficiency is better at the higher epichlorohydrin to polyamidoamine secondary amine mol ratios. As understood by those skilled in the art, if the mole ratio is too high instability problems may be encountered and contributes to undesirable loss of and potential pollution by the epihalohydrin. As above, selection of an appropriate mole ratio is within the skill of the art and the present invention is not limited to any particular range. Once the epihalohydrin-polyamidoamine reaction has proceeded to the desired extent, further reaction is quenched with the combination of cooling and adding an acid to reduce the pH of the reaction mixture usually to about 3.0.

It is generally accepted by those skilled in the art that the functional group that results from the reaction of the polyamidoamine polymer with the epihalohydrin that is most responsible for the cationic charge and the thermosetting character of these cationic PAE resins is the azetidinium group or moiety. It is believed that most cross-linking in a PAE resin results from reactions between either secondary and/or tertiary amines and the azetidinium groups of the PAE resin. It is the reaction of the azetidinium groups with such secondary and/or tertiary amines that is also believed to cause the undesired increase in PAE viscosity, possibly leading to premature gelation of the PAE resin, on storage of such resins.

Illustrative commercially-available adducts of epoxides (e.g., epihalohydrins) with polyamidoamine resins, include those sold under the names AMRES® (Georgia-Pacific LLC), as well as KYMENE® and REZOSOL® (Hercules, Inc.). Specific examples of such resins include AMRES-25 HP® (Georgia-Pacific LLC), which is formed from the reaction product of epichlorohydrin and a polyamide, as well as KYMENE 557H® (Hercules, Inc.), which is formed from the reaction product of epichlorohydrin and poly(adipic acid-co-diethylenetriamine).

In accordance with the present invention, the above-noted cationic water-soluble thermosetting resins and polymers, and especially the cationic water soluble thermosetting PAE resins, such as those prepared as described above, are stabilized for extended storage by adding to the aqueous cationic resin or polymer (1) a non-aldehyde, low molecular weight, non-ionic, water soluble organic stabilizing compound, optionally in combination with (2) a water soluble, inorganic complexing metal salt. As noted earlier, though again not wanting to be bound by the following explanation, applicants believe that stabilizing compounds that are reactive (albeit mildly) with the moiety responsible for the thermosetting character of the cationic thermosetting resin or polymer, and especially stabilizing compounds that are reactive with the azetidinium group of a cationic PAE resin, are preferably used as the non-aldehyde, low molecular weight, non-ionic, water soluble organic stabilizing compound.

Again, without wishing to be bound by any particular theory, applicants believe that by adding a non-aldehyde, low molecular weight, non-ionic, water soluble organic stabilizing compound to the cationic resin, such as a PAE resin, and especially a stabilizing compound with a tertiary amine function or a primary amide function, particularly where the organic stabilizing compound has a degree of reactivity with the azetidinium group similar to that of the amine moieties of the PAE rein itself, the non-aldehyde stabilizing compound interferes with, and/or inhibits reactions between high molecular weight PAE molecules. Such reactions between high molecular weight PAE molecules undesirably build viscosity and led to premature gelation of the PAE resin. As the added low molecular weight non-aldehyde stabilizing compound (molecule) reacts with an azetidinium group of a PAE molecule there is a negligible change in the molecular weight of the PAE resin and thus only a negligible change in viscosity of the PAE resin. By also adding a water soluble, inorganic completing metal salt to the cationic resin, especially to a PAE resin, the rate at which these inhibiting reactions between the added low molecular weight non-aldehyde stabilizing compound and the cationic PAE molecules occur and also the rate at which reactions between PAE resin molecules through the azetidinium moieties occur are suitably retarded, so that these reactions do not in turn cause or contribute to an undesired decrease in the wet strengthening efficiency of the cationic resin, such as the wet strengthening effectiveness of a cationic thermosetting PAE resin. The overall result is thus a significant improvement in the storage stability of the cationic thermosetting resin, e.g., cationic PAE resin, maintained at a relatively high solids content, without an undesired loss in wet strengthening efficiency.

As used throughout the specification and in the claims, the phrase "low molecular weight" is intended to mean a molecular weight below about 5000. Preferably, the low molecular weight, non-aldehyde, non-ionic, water soluble organic stabilizing compound has a molecular weight below about 1000 and often the molecular weight of the low molecular weight, non-aldehyde, non-ionic, water soluble organic stabilizing compound will be below about 300.

Representative non-aldehyde, low molecular weight, non-ionic, water soluble organic stabilizing compounds (1) that can be used in practicing the present invention include: (a) water soluble tertiary amines, such as triethanolamine, 2-dimethylamino ethanol, aminopropyl diethanolamine and the like (b) water soluble amides, and especially water soluble primary amides such as adipamide $NH_2C(O)(CH_2)_4C(O)NH_2$), thiourea ($NH_2C(S)NH_2$), low molecular weight urea-formaldehyde oligomers, urea ($NH_2C(O)NH_2$), water soluble polyamine-urea adducts, such as the urea adduct with 3,3'-diamino-N-methyldipropylamine, i.e., ($NH_2C(O)N(H)$—$(CH_2)_3$—$N(CH_3)$—$(CH_2)_3N(H)C(O)NH_2$) and the like, (c) low molecular weight carbohydrates including various monosaccharides, disaccharides, trisaccharides, and polysaccharides, (d) low molecular weight polyalcohols (polyols) including glycerol, sorbitol, polyvinyl alcohol and various other polyols.

Representative carbohydrates include monosaccharides, such as glycerose, disaccharides such as sucrose, trisaccharides, such as raffinose and polysaccharides such as starch. Starch sources which can be used include various plant carbohydrates, such as barley starch, indian corn starch, rice starch, waxy maize starch, waxy sorghum starch, tapioca starch, wheat starch, potato starch, pearl starch, sweet potato starch, and the like, and non-ionic derivatives thereof. Examples of starch derivatives, often called converted or modified starches, include oxidized starches, hydroxyalkylated starches (e.g., hydroxyethylated corn starch), carboxyalkylated starches, various solubilized starches, enzyme-modified starches, thermo-chemically modified starches, etc.

The low molecular weight, non-aldehyde, non-ionic, water soluble organic stabilizing compound is added to the cationic thermosetting resin or polymer, such as to a thermosetting PAE resin in a stabilizing enhancing amount. Usually, an amount of the low molecular weight, non-aldehyde, non-ionic, water soluble organic stabilizing compound that represents at least about 10% of the molar amount of the epihalohydrin used in the functionalization, e.g., synthesis of the cationic thermosetting resin or polymer, e.g., the PAE resin, should be sufficient. Generally, the amount of added low molecular weight, non-aldehyde, non-ionic, water soluble organic stabilizing compound should not be significantly above a stoichiometric equivalent of, or a slight stoichiometric excess of the molar amount of the epihalohydrin used in the synthesis of the cationic thermosetting resin or polymer, e.g., the PAE resin. In most cases, an amount of the low molecular weight, non-aldehyde, non-ionic, water soluble organic stabilizing compound of from about 0.1% to about 25% by weight based on the weight of the cationic thermosetting resin or polymer solids and more usually 1 to 15% by weight should be suitable. On a resin weight basis, applicants have determined, for example, that when urea is used alone as the low molecular weight, non-aldehyde, non-ionic, water soluble organic stabilizing compound, the urea can be beneficially added in an amount of 0.1 to 25% by weight of the PAE resin solids. Usually, an amount of urea between about 0.1 and 17% by weight of the PAE resin solids should be sufficient in most cases.

The other component of the stabilization package of the present invention is the optional water soluble, inorganic complexing metal salt (2). Suitable water soluble, inorganic complexing metal salts include the water soluble salts of a complexing metal having a electron charge density greater than that of sodium. The electron charge density of a metal constitutes the electrostatic charge of the metal cation, i.e., the valence of the metal as present in the water soluble salt, divided by the metal's atomic radius. Suitable complexing metals include aluminum, zinc, calcium, chromium, iron, magnesium and lithium. Suitable water soluble salts of these metals usually include the nitrates, sulfates, chlorides and bromides. Representative water soluble, inorganic complexing metal salts thus include zinc chloride, magnesium chloride, calcium chloride and lithium chloride. A particularly preferred water soluble, inorganic complexing metal salt is aluminum sulfate, also known as alum. Alum is a common paper chemical and thus is widely available.

The water soluble, inorganic complexing metal salt (2) can be added to the PAE resin either before or after the addition of the low molecular weight non-aldehyde, non-ionic stabilizing compound (1) to the PAE resin. In fact, in the broad practice of the present invention the water soluble, inorganic complexing metal salt can be added to the reaction mixture along with the epihalohydrin during the synthesis of the cationic thermosetting resin or polymer, such as during the synthesis of a PAE resin. In that case, the reaction between the polymer backbone, such as the polyamidoamine backbone, and the epihalohydrin occurs in the presence of the water soluble, inorganic complexing metal salt.

The water soluble, inorganic complexing metal salt, when optionally added, is also added to the cationic thermosetting resin or polymer, such as a PAE resin, in a stabilizing enhancing amount. Usually, an amount of the complexing metal salt up to the amount that represents a stoichiometric equivalent to, or a slight stoichiometric excess of the amount of epihalohydrin that was used in the synthesis of the cationic thermosetting resin or polymer, such as used in the synthesis of the PAE resin, should be sufficient. On a resin weight basis, applicants have determined that the water soluble, inorganic complexing metal salt can be beneficially added in an amount up to about 10% by weight of the cationic thermosetting resin or polymer solids. Usually, an amount of the water soluble inorganic complexing metal salt of up to about 5% by weight of the cationic thermosetting resin or polymer solids should be sufficient.

Best results are generally obtained when the low molecular weight non-aldehyde, non-ionic stabilizing compound (1) and the water soluble, inorganic complexing metal salt (2) are used in combination. Adding the combination of the low molecular weight, non-aldehyde, non-ionic, water soluble organic stabilizing compound (1) and the water soluble, inorganic complexing metal salt (2) to the aqueous cationic thermosetting resin or polymer generally acts as a diluting agent causing about a 30 cps drop in the viscosity of the polymer, as has been observed in stabilized PAE resins. When accounting for this viscosity reduction in the synthesis of the cationic thermosetting resin or polymer, the initial synthesis can actually proceed to a higher viscosity end-point than would normally be the ease in the prior art. Because of this viscosity-reducing effect, the stabilization system of the present invention thus allows for a shelf stable wet strengthening composition at a higher solids concentration than typically encountered in the prior art. For example, producing a PAE resin with a solids content above about 25% by weight is readily attainable when practicing the present invention. The use of the inventive stabilization package also typically permits the synthesis of the cationic thermosetting resin or polymer, and specifically a PAE resin, at a resin molecular weight about 10% higher than workable with prior art stabilization approaches. This ultimately produces a cationic thermosetting resin or polymer that exhibits better wet strengthening performance.

As noted above, the stabilization package of the low molecular weight, non-aldehyde, non-ionic, water soluble organic stabilizing compound (1) and the optional water soluble, inorganic complexing metal salt (2) can also optionally be used in combination with known acid stabilization techniques, such as those described in U.S. Pat. No. 3,197,427 and U.S. Pat. No. 4,853,431, to provide a further level of cationic thermosetting resin or polymer stability enhancement. Such acid stabilization techniques generally involve some combination of adding weak and strong acids to the aqueous cationic thermosetting resin or polymer composition.

Suitable weak acids include but are not limited to formic acid, acetic acid, benzoic acid, oxalic acid, propionic acid, citric acid, malonic acid, and various urea-acid adducts such as urea sulfate, urea hydrochloride, urea phosphate, urea nitrate and the like. These urea adducts represent a preferred feature of the present invention because they double both as a weak acid source for quenching and possibly acid-stabilizing the cationic thermosetting resin or polymer, and as a source of urea, i.e., a low molecular weight, non-aldehyde, non-ionic, water soluble organic stabilizing compound. This preferred aspect of the invention is exemplified in Example 8. Strong acids typically include hydrochloric acid, nitric acid, sulfuric acid, perchloric acid phosphoric acid and the like. When used, such weak and strong acids are generally added in an amount below about 5% by weight of cationic thermosetting resin or polymer solids and usually in an amount of less than about 1% by weight.

As noted, one possible acid stabilization technique is described in U.S. Pat. No. 4,853,431 wherein a mixture of a weak acid, such as formic acid, and a strong acid such as sulfuric acid is added to the PAE resin. The aqueous mixture of the weak and strong acids can be prepared by first adding the necessary amount of a weak acid to ballast water and then slowly adding the desired amount of the strong acid to the aqueous weak acid solution. In the case of a mixed acid prepared using formic acid and sulfuric acid, it is preferred to maintain the relative amount of formic acid and sulfuric acid in the mixed acid between about 2 parts by weight of formic acid per part by weight of sulfuric acid, up to about 4 parts by weight of formic acid per part by weight of sulfuric acid. Preferably, about 2.9 to 3.0 parts by weight of formic acid per part by weight of sulfuric acid are included in the mixed acid.

The preferred combination of the non-aldehyde, non-ionic, water soluble organic stabilizing compound and the optional inorganic complexing salt, along with the optional stabilization acid, can be added to the aqueous cationic thermosetting polymer or resin, and especially the aqueous cationic thermosetting PAE resin in a variety of ways.

For example, an aqueous mixture of a non-aldehyde, non-ionic, water soluble organic stabilizing compound and a desirable quenching acid can be prepared by adding the necessary amount of an organic compound to ballast water, and then slowly adding the desired amount of the strong acid or an acid blend, and thereafter using this mixture to quench the synthesis of a cationic thermosetting polymer, such as the progress of the polyamidoamine-epihalohydrin reaction. Alternatively, a urea-acid adduct, such as urea sulfate, which as noted above acts as both an acid source and a urea source, can be used as an equivalent to the noted aqueous mixture of a non-aldehyde, non-ionic, water soluble organic stabilizing compound and the quenching acid. Then, the inorganic complexing salt would be added to the resulting solution at a temperature of about 50° C.

In an alternative approach, the non-aldehyde, non-ionic, water soluble organic stabilizing compound and the inorganic complexing salt are added to the aqueous cationic resin solution simultaneously immediately after the acidic quench, when the solution temperature is at a temperature of about 50° C.

In still another preferred method, the non-aldehyde, non-ionic, water soluble organic stabilizing compound is added to an acid-quenched aqueous cationic resin solution when the resin has been cooled to a temperature of about 50° C., mixing and further cooling the mixture solution for about 30 minutes and then adding an inorganic complexing salt.

In yet another technique, an aqueous mixture of the non-aldehyde non-ionic, water soluble organic stabilizing compound and the inorganic complexing salt is prepared by adding the desired amount of the salt and the organic compound to ballast water, the mixing is conducted at a temperature within the range of about 40 to 50° C. This mixture is then added to an aqueous cationic PAE resin right after acid quenching of the resin.

Usually, a thermosetting cationic PAE resin solution to be stabilized in accordance with the present invention is prepared at a solids content of between about 10 and 40% by weight and normally the solids content falls in the range of 10 to 30%. In most cases a thermosetting cationic PAE resin solids content of about 25% will be the target. Testing has shown that the shelf life of a commercial 25% by weight thermosetting cationic PAE resin stabilized with a combination of strong and weak acids is typically about 16 days at a temperature of 35° C. (about 95° F.). Upon using a preferred stabilization combination of alum (aluminum sulfate) and urea as pan of the stabilization package, the shelf life of a comparable thermosetting cationic PAE resin has been observed to increase, up to a stability period of about 40 days or more at 35° C. (about 95° F.).

Stabilized thermosetting cationic polymer or resin solutions, including specifically thermosetting polyamidoamine-epihalohydrin (PAE) resin solutions, of the present invention have the same utility as the prior art thermosetting cationic materials as wet strengthening agents for paper materials, such as paper towels, absorbent facial tissue, absorbent bathroom tissue, napkins, wrapping paper, and other paperboard products such as cartons and bag paper. The stabilized thermosetting cationic polymer or resin solutions of the present invention, including stabilized cationic PAE resins, also can be used in the same way. For example, preformed or partially dried paper can be impregnated by immersion in the aqueous cationic thermosetting resin, or by spraying the aqueous cationic thermosetting resin onto the paper. Alternatively, the aqueous cationic thermosetting resin can be added to the water from which the paper is initially formed. Thereafter, the resin-treated paper is heated for about 0.5-30 minutes at temperatures of about 80° C. or higher to fully cure the thermosetting resin to a water-insoluble material. The present invention is not limited to any particular way of using the cationic resin.

As is common in the prior art, the cationic thermosetting resin or polymer, such as a thermosetting cationic PAE resin, usually is incorporated in the paper at an amount within the range of about 0.1-5% by dry weight of the paper. Even so, the use of any particular amount of cationic thermosetting resin is not a feature of the present invention. However, because of the stability enhancing effect of the present invention, cationic thermosetting resins and particularly cationic thermosetting PAE resins of a higher wet strengthening efficiency (higher initial viscosity) can often be prepared which may have the advantage of allowing a reduction of the amount of cationic thermosetting resin and particularly cationic thermosetting PAE resin needed to obtain a desired level of wet strength in the final paper product in any particular application. As understood by those skilled in the art, quantities of thermosetting cationic resin added to an aqueous paper stock or directly to a paper product will depend to a large extent on the degree of wet strength desired in the finished product and on the amount of cationic thermosetting resin actually retained by the paper fibers.

The following examples are provided to assist in the understanding of the invention and are not intended to be limitations on the scope of the disclosure. All reported percentages and parts of solid are on a weight basis, unless otherwise specifically indicated.

Comparative Example 1

Starting with a polyamidoamine polymer, the polymer is diluted to 30% by weight solids content and is reacted with epichlorohydrin until the resulting PAE resin reaches a viscosity of about 170 cps. A blend of formic acid and sulfuric acid is used to quench this polymerization reaction by lowering the pH to 3.0. The solution is then diluted with water to 25% by weight solids. The solution is mixed with the blended acid and finally adjusted to a pH of 2.85. Prior to the present invention, utilizing the blended acid to quench the reaction has been employed commercially as a preferred stabilization technique. Thus, a PAE resin sample quenched by the blended acid is used as a control for assessing resin stability of the present invention.

Comparative Example 2

Starting with a polyamidoamine polymer, the polymer is diluted to 30% by weight solids content and is reacted with epichlorohydrin until the resulting PAE resin reaches a viscosity of about 135 cps. The same blend of formic acid and sulfuric acid used in Comparative Example 1 is used to quench the polymerization reaction by lowering the pH to 3.0. The solution is then diluted with water to 25% by weight solids. The solution is mixed with the blended acid and adjusted to a pH of 2.85. Since using the blended acid to quench the reaction has been employed commercially as a preferred stabilization technique, this PAE resin sample quenched by the blended acid is used as another control for assessing resin stability of the present invention.

Example 3

The same PAE resin prepared in Comparative Example 1 is adjusted to a 30% by weight solids content and the pH is adjusted to 3.0 with the same blend of formic and sulfuric acid used in Comparative Example 1. To the sample is added 7% by weight of a urea-formaldehyde oligomer based on PAE resin solids. The solution is then diluted with water to 25% by weight solids. The solution is mixed with the blended acid and finally adjusted to pH 2.85.

Example 4

The same PAE resin prepared in Comparative Example 1 is adjusted to a 30% by weight solids content and the pH is adjusted to 3.0 with the same blend of formic and sulfuric acid used in Comparative Example 1. To the pH-adjusted solution is added 20 wt % of a solution of polydiallyldimethylammonium chloride (polyDADMAC) (Agefloc WT35VLV, 30% solids, purchased from Ciba Specialty Chemicals, Old Bridge, N.J.), based on the weight of the PAE resin solids to provide a blended polymer. To the so-prepared blended cationic polymer solution is added 7% by weight of the same urea-formaldehyde oligomer used in Example 3, based on the total weight of solids of the polymer mixture (blend). The solution is then diluted with water to 25% by weight solids. The solution is mixed with the blended acid and finally adjusted to pH 2.85.

Example 5

The PAE resin prepared in Comparative Example 2 is adjusted to 30% by weight solids content and the pH is adjusted to 3.0 with the same blend of formic and sulfuric acid used in the preceding examples. To the pH-adjusted sample is added 22% by weight of a polyamine-urea adduct based on the weight of PAE resin solids. The solution is then diluted with water to 25% by weight solids. The solution is mixed with the blended acid and finally adjusted to pH 2.85.

Example 6

The PAE resin prepared in Comparative Example 2 is adjusted to 30% by weight solids content and the pH is adjusted to 4.5 with sulfuric acid only. To the sample is added 15.4% by weight urea and 6.6% by weight alum based on the weight of PAE resin solids. The solution is then diluted with water to 25% by weight solids. The solution is mixed with and finally adjusted to a pH of 2.85 using sulfuric acid.

Example 7

The PAE resin prepared in Comparative Example 2 is adjusted to 30% by weight solids content and the pH is adjusted to 4.5 with the same blend of formic and sulfuric acid used in the preceding examples. To the pH-adjusted sample is added 15.4% by weight urea and 6.6% by weight alum based on the weight of PAE resin solids. The solution is then diluted with water to 25% by weight solids. The solution is then mixed with and finally adjusted to pH 2.85 using the blended acid.

Example 8

The PAE resin prepared in Comparative Example 2 is adjusted to 30% by weight solids content and the pH is adjusted to 4.5 with a urea sulfate solution (68% by weight solids, purchased from Peach State Labs, Inc.). To the pH-adjusted sample is added 6.5% by weight alum and 14.5% urea based on the weight of the PAE resin solids. The solution is then diluted with water to 25% by weight solids. The solution is mixed and finally adjusted to a pH of 2.85 with the urea sulfate solution.

Table 1 below summarizes key properties of all of the preceding examples. The comparative stability of the various samples is determined by storing the samples at an elevated temperature of 35° C. Each sample is tested periodically for its viscosity and the time to reach gelation is monitored. Table 1 shows the comparative effect, as stabilizing agents, of a number of low molecular weight compounds or their combination with a complexing metal salt.

TABLE 1

Comparative Stability of Samples with Target Solids of 25% and Resin pH of 2.85

| Example No | Quench Acid Type | Percent Stabilizer Added[1] | Initial Resin Viscosity (cps) | Days to Gel at 35° C. storage |
|---|---|---|---|---|
| 1 | Blend of formic and sulfuric acid | None | 170 | 15 |
| 2 | Blend of formic and sulfuric acid | None | 135 | 21 |
| 3 | Blend of formic and sulfuric acid | 7% UF oligomer | 172 | 45 |
| 4 | Blend of formic and sulfuric acid | 7% UF oligomer | 170 | 60 |
| 5 | Blend of formic and sulfuric acid | 22% polyamine urea adduct | 136 | >30 |
| 6 | sulfuric acid only | 15.4% urea and 6.6% alum | 162 | 80 |
| 7 | Blend of formic and sulfuric acid | 15.4% urea and 6.6% alum | 145 | >90 |
| 8 | Urea sulfate only | 0.65% urea (from urea-sulfate) and 14.5% urea (from 40% urea solution) and 6.5% alum | 150 | >90 |

[1]Based on resin content of the solution

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

What is claimed is:

1. An aqueous cationic thermosetting resin having a pH of less than 6.0, a solids content between 10 and 40% by weight and a prolonged stability comprising a non-aldehyde, non-ionic, water soluble organic stabilizing compound in a stabilizing amount of 0.1% to 25% by weight of the cationic thermosetting resin, the non-aldehyde, non-ionic, water soluble organic stabilizing compound having a molecular weight of below about 1000 and being selected from the group consisting of (a) a water soluble tertiary amine (b) a water soluble amide (c) a water soluble carbohydrate, (d) a water soluble polyol and (e) mixtures thereof and optionally including a water soluble, inorganic complexing metal salt, wherein the non-aldehyde, non-ionic, water soluble organic stabilizing compound is added to the thermosetting resin having a pH of less than 6.0.

2. The aqueous thermosetting cationic resin of claim 1 wherein the water soluble polyamine-urea adduct is the reaction product of 3,3'-diamino-N-methyldipropylamine and urea.

3. The aqueous thermosetting cationic resin of claim 1 comprising a stabilizing amount of a water soluble, inorganic complexing metal salt.

4. The aqueous thermosetting cationic resin of claim 3 wherein the metal of the water soluble, inorganic complexing metal salt is selected from the group consisting of aluminum, zinc, calcium, chromium, iron, magnesium lithium and mixtures thereof.

5. The aqueous thermosetting cationic resin of claim 4 wherein the salt is selected from the group consisting of a nitrate, a sulfate, a chloride, a bromide, and mixtures thereof.

6. The aqueous thermosetting cationic resin of claim 3 wherein the non-aldehyde, low molecular weight, non-ionic, water soluble organic stabilizing compound is urea and the water soluble, inorganic complexing metal salt is alum.

7. The aqueous thermosetting cationic resin of any one of claims 1 through 6 wherein the thermosetting cationic resin is a polyamidoamine-epihalohydrin resin.

8. The aqueous cationic thermosetting resin having a prolonged stability of claim 1 comprising a stabilizing amount of urea and a water soluble, inorganic complexing metal salt.

9. A method of stabilizing an aqueous thermosetting cationic resin against gelation comprising adding to the aqueous thermosetting cationic resin having a pH of less than 6.0 and a solids content between 10 and 40% by weight a non-aldehyde, non-ionic, water soluble organic stabilizing compound in a stabilizing amount of 0.1% to 25% by weight of the cationic thermosetting resin, the non-aldehyde, non-ionic, water soluble organic stabilizing compound having a molecular weight of below about 1000 and being selected from the group consisting of (a) water soluble tertiary amines (b) water soluble amides (c) water soluble carbohydrates, (d) water soluble polyols and (e) mixtures thereof.

10. The stabilizing method of claim 9 wherein a stabilizing amount of a water soluble, inorganic complexing metal salt also is added to the aqueous thermosetting cationic resin.

11. The stabilizing method of claim 10 wherein the low molecular weight, non-aldehyde, non-ionic, water soluble organic stabilizing compound is the water soluble tertiary amine and the water soluble tertiary amine is selected from the group consisting of triethanolamine, 2-dimethylamino ethanol, aminopropyl diethanolamine, and mixtures thereof.

12. The stabilizing method of claim 10 wherein the low molecular weight, non-aldehyde, non-ionic, water soluble organic stabilizing compound is the water soluble amide and the water soluble amide is selected from the group consisting of adipamide, thiourea, low molecular weight urea-formaldehyde oligomers, water soluble polyamine-urea adducts, urea and mixtures thereof.

13. The stabilizing method of claim 12 wherein the water soluble polyamine-urea adduct is the reaction product of 3,3'-diamino-N-methyldipropylamine and urea.

14. The stabilizing method of claim 10 wherein the metal of the water soluble, inorganic complexing metal salt is selected from the group consisting of aluminum, zinc, calcium, chromium, iron, magnesium lithium and mixtures thereof.

15. The stabilizing method of claim 14 wherein the salt is selected from the group consisting of a nitrate, a sulfate, a chloride, a bromide, and mixtures thereof.

16. The stabilizing method of claim 10 wherein the low molecular weight, non-aldehyde, non-ionic, water soluble organic stabilizing compound is urea and the water soluble, inorganic complexing metal salt is alum.

17. The stabilizing method of one of claims 9 through 16 wherein the thermosetting cationic resin is a polyamidoamine-epihalohydrin resin.

* * * * *